United States Patent [19]

Reese

[11] Patent Number: 4,602,297

[45] Date of Patent: Jul. 22, 1986

[54] SYSTEM FOR EDITING COMMERCIAL MESSAGES FROM RECORDED TELEVISION BROADCASTS

[76] Inventor: Morris Reese, 1707 Fordham Ave., Thousand Oaks, Calif. 91360

[21] Appl. No.: 710,379

[22] Filed: Mar. 11, 1985

Related U.S. Application Data

[63] Continuation-in-part of Ser. No. 693,380, Jan. 22, 1985, abandoned.

[51] Int. Cl.⁴ ..................... H04N 5/782; G11B 27/08
[52] U.S. Cl. .................................. 360/14.1; 360/13; 358/908
[58] Field of Search ....................... 360/14.1, 13, 33.1; 358/908

[56] References Cited

U.S. PATENT DOCUMENTS

| | | | |
|---|---|---|---|
| 4,167,704 | 9/1979 | Sato et al. | 360/33.1 X |
| 4,261,020 | 4/1981 | Beeson et al. | 360/14.1 X |
| 4,314,285 | 2/1982 | Bonner et al. | 360/33.1 X |
| 4,319,286 | 3/1982 | Hanpachern | 360/33.1 |
| 4,395,740 | 7/1983 | Yuen et al. | 360/33.1 X |
| 4,430,676 | 2/1984 | Johnson | 360/13 |

Primary Examiner—Raymond F. Cardillo
Assistant Examiner—Wayne R. Young
Attorney, Agent, or Firm—Keith D. Beecher

[57] ABSTRACT

A system for producing an editing control signal for a video tape recorder at the beginning of one or more television commercial messages and which continues for the duration of the commercial messages. The system incorporates a detector circuit for automatically detecting each transition in a received television signal between the program itself and the commercial messages and for producing a control pulse indicating such transition. The video tape recorder receives a television signal, after the television signal has been delayed a predetermined time interval to permit a decision to be made as to whether or not a portion of the television signal is to be deleted and the duration of the deletion. Only when a first control pulse from the detector circuit is followed by a second or more control pulses within a predetermined time interval is the commercial portion of the television signal deleted, and the deletion occurs precisely from the start of the first commercial in a group and continues to the end of the last commercial in the group. The system is also capable of recording simultaneously from two different television channels at the same time, while viewing a third channel, and of recording pre-recorded information from one tape to another.

9 Claims, 5 Drawing Figures

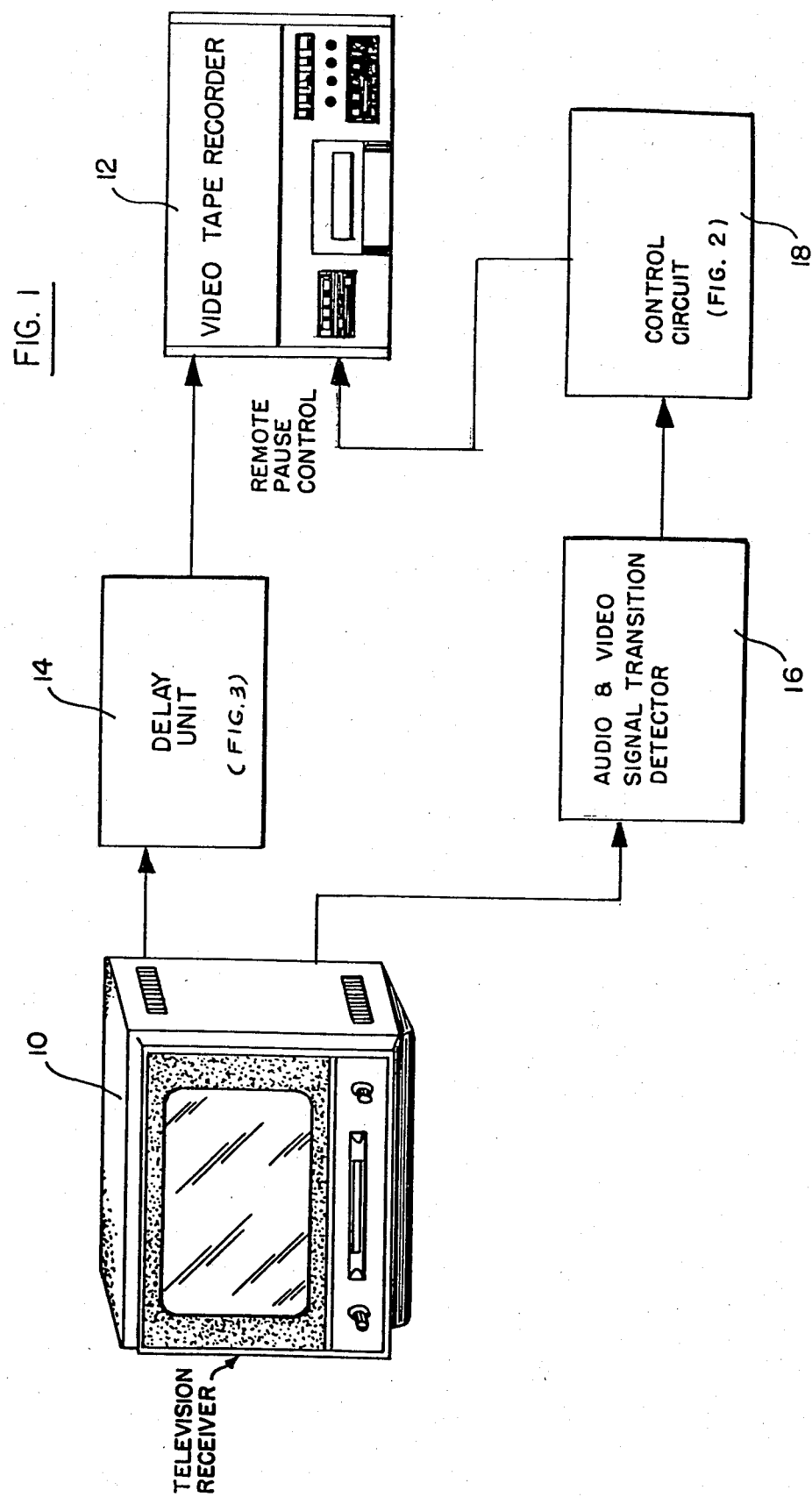

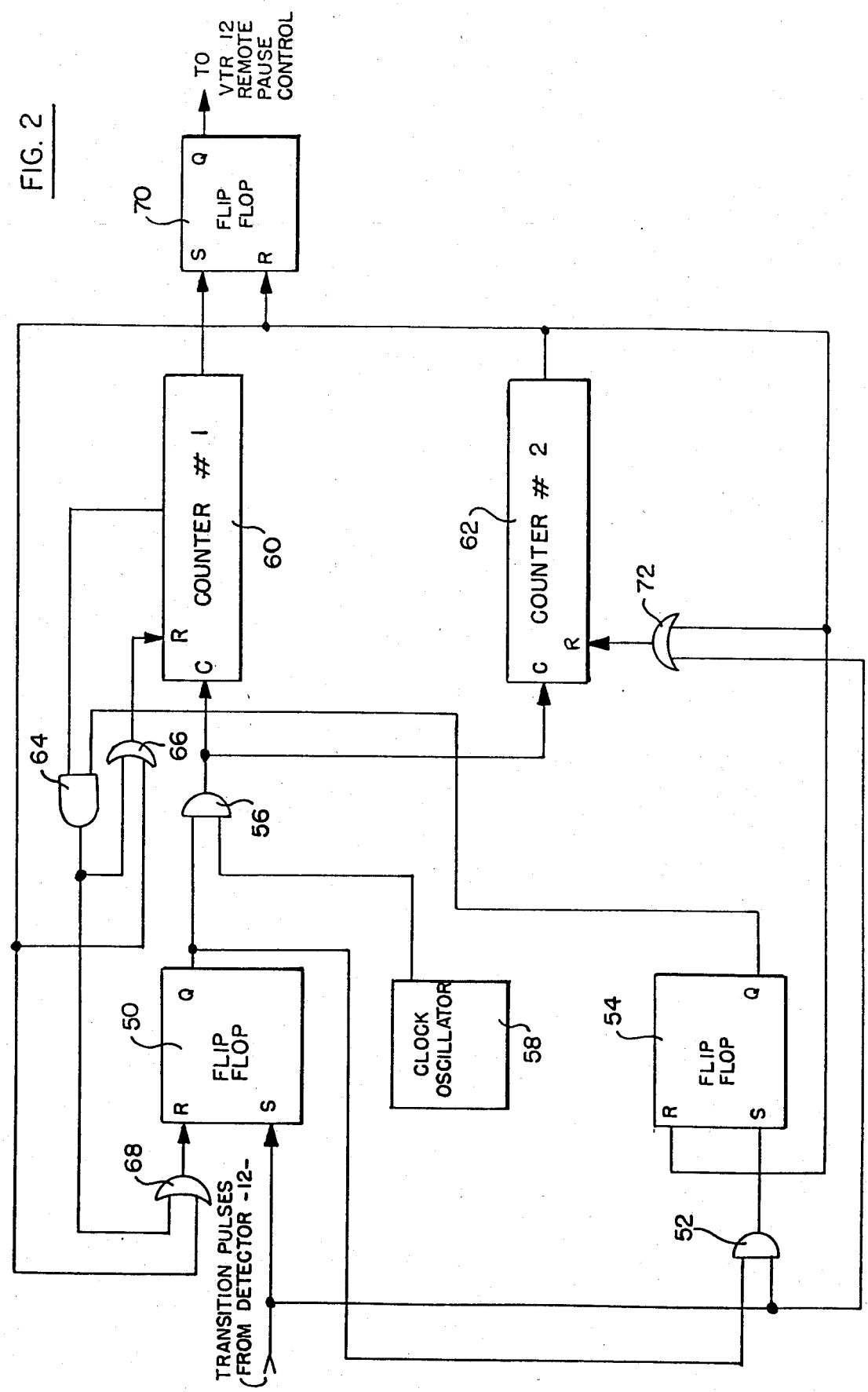

SYSTEM FOR EDITING COMMERCIAL MESSAGES FROM RECORDED TELEVISION BROADCASTS

This is a continuation-in-part of copending application Ser. No. 693,380 filed Jan. 22, 1985, abandoned.

BACKGROUND OF THE INVENTION

The removal of commercial messages from received television signals during the home recording of television programs has been a goal of the video equipment industry for many years. Accordingly, several systems have been proposed in the prior art which attempt to achieve that objective. However, attempts in the prior art to provide a reliable system for automatically detecting the occurrence of commercial breaks in received television signals have been only partially successful.

It is known that just prior to a commercial message, the amplitude of the video signal of the television signal drops towards the black level, and the amplitude of the audio fades towards the zero sound level. The prior art systems usually include a detector circuit which detects each such drop in the video and audio components of the received television signal and which produces an output pulse in response thereto. The prior art systems also usually include a timing circuit which is triggered by each pulse from the detector circuit to produce an editing control signal which continues for the duration of a standard commercial break. It is usual prior art practice to apply the editing control signal to the remote pause control of the video tape recorder so that the video tape recorder is hopefully stopped for the duration of the commercial messages and does not record the commercial messages.

However, the prior art systems are subject to a major disadvantage. Namely, should a drop occur in the amplitude of the video and audio content of the television program itself, the prior art detector circuit treats the drop as the start of a commercial message, so that the ensuing portion of the television program is not recorded, and portions of the program are lost. Also, in the prior art systems the duration of the editing signal is an arbitrarily fixed time and portions of the program following a commercial break are often inadvertently blanked out.

The present invention has overcome the shortcomings of the prior art by introducing an affordable apparatus which when connected to an existing video tape recorder, will control a program delay system, such that valid determinations can be made between unwanted and wanted television program material prior to recording.

This system of the invention has four major elements:

(1) Information processing to identify the unwanted material.

(2) Tape delay system to provide sequential storage and delay of all incoming material so that valid determinations can be made between desired and unwanted program material.

(3) A control system to coordinate the information processing choices and the editing actions.

(4) A means to edit or delete or stop the information feed from the system to the video recorder or other instrumentality.

SUMMARY OF THE INVENTION

The system of the present invention is unresponsive to single amplitude drops in the video and audio content of a received television signal, and it reacts only if each such drop is followed within a pedetermined time interval exceeding the duration of any normal multi-commercial break, by a second amplitude drop indicating the occurrence of an actual commercial. The system also responds to all additional amplitude drops within the predetermined time interval to reactivate the video recorder at the precise termination of the last commercial in the group.

The foregoing is achieved by delaying the application of the television signal to the video tape recorder by a time interval corresponding to a predetermined time delay interval, so that the video content of the television signal may be sensed at the beginning and end of each commercial of a multi-commercial group to determine whether the amplitude drop in the video and audio content actually represented a commercial. Then, if the break did not signify the start of a commercial, the delayed video program following the break is recorded. However, if the break did in fact represent a commercial, the delayed television signal is not recorded for a time interval corresponding exactly to the time from the start of the first commercial in the group to the end of the last commercial in the group.

In brief, the system of the invention operates so that the commercial editing signal will be generated only in the event the amplitude of the video and audio content of the television signal falls below a predetermined minimum on two or more successive occasions within a predetermined time interval exceeding the normal duration of a group of successive commercial messages, and the system operates to prevent the recording of all of the commercial messages in the group precisely from the start of the first commercial to the end of the last commercial.

The inclusion of a delay unit in the system of the invention is the key to genuine success in the full elimination of commercials, and of obviating any tendency of losing program material, as is the case of several of the prior art systems. The delay unit may be in the form of a video tape recorder, and the inclusion of such a recorder provides the overall system with other functions, when not in the delay mode. For example, recording from one video tape to another while viewing a program is possible, and also recording two different channels at the same time, even while viewing a third channel, also is possible, as will be described.

BRIEF DESCRIPTION OF THE DRAWINGS

FIG. 1 is a block diagram of the system of the invention in one of its embodiments;

FIG. 2 is a logic diagram of a control circuit which is included in the system of FIG. 1;

DETAILED DESCRIPTION OF THE ILLUSTRATED EMBODIMENT

Figure 4:
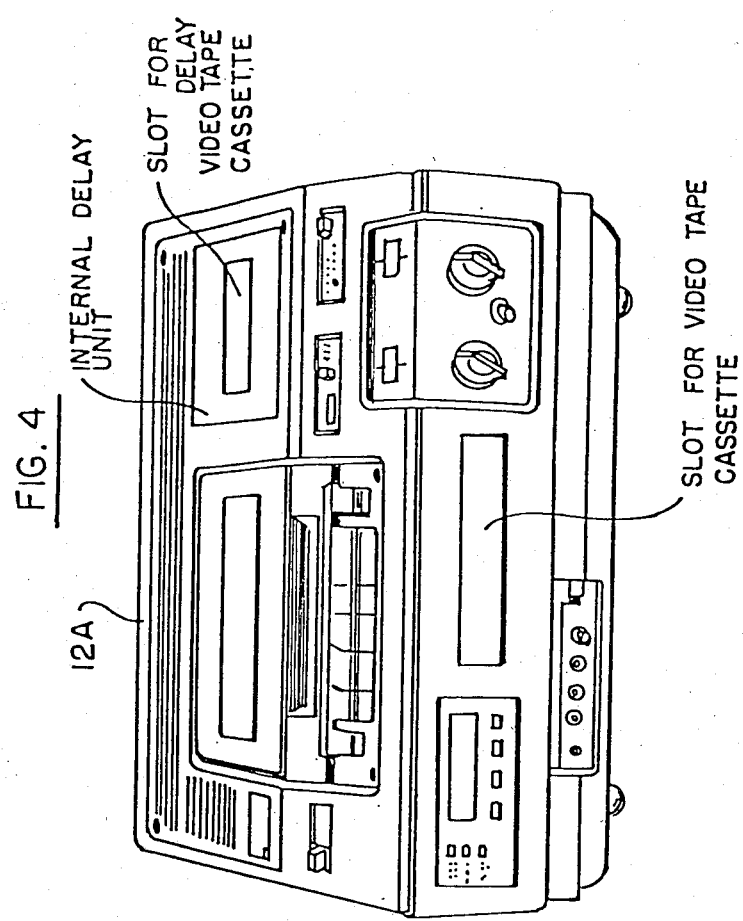
FIG. 4 is a representation of a video tape recorder which contains the delay unit of FIG. 3.
Figure 3:
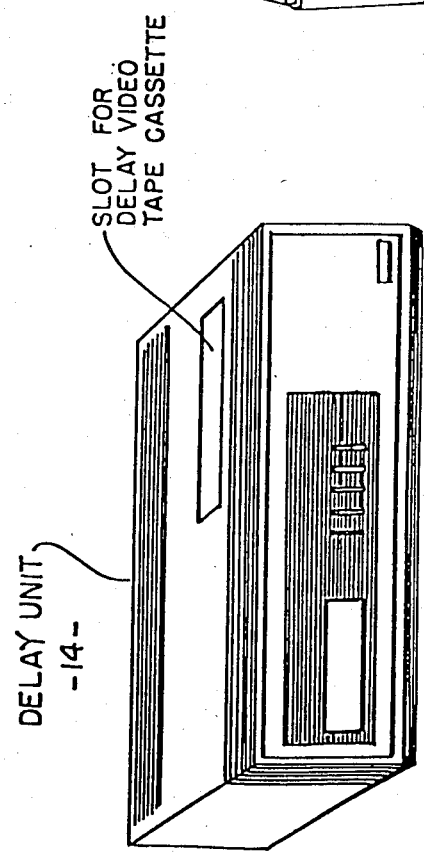
FIG. 3 is a representation of a delay unit included in the system of the invention in one of its embodiments.

In the system of FIG. 1, a television receiver 10 is connected to a video tape recorder 12 through a delay unit 14 (FIG. 3). The video tape recorder may be set to record selected programs from the television receiver 10. The delay unit 14 may, for example, be a video tape recording and reproducing unit which includes a video tape drive, a write head for writing the television signals received from the television receiver 10 on a video tape, and a read head for reading the television signal from the video tape after a predetermined time interval from the video tape, and for applying the delayed television signal to the video tape recorder 12. The video tape may be contained in a cassette which may be inserted into the delay unit of FIG. 3 through an appropriate slot. The video tape in the cassette may be a loop. The delay unit 14 may be incorporated into the video tape recorder 12A (FIG. 4) with a slot being provided in the recorder to receive the delay video tape cassette to achieve the desired delay. A second slot may also be provided in the recorder 12A of FIG. 4 to receive a video tape cassette with a substitute message.

For reasons to become apparent subsequently, this predetermined time interval is made to exceed the duration of a typical multi-commercial break in the received television signal. This time may be of the order of 2-3 minutes by present-day television systems.

The system of the invention also includes a transition detector 16 which receives the video and audio content of the received television signal from the receiver 10 in an undelayed state and which generates an output pulse each time the amplitudes of the video and audio content drop below a predetermined threshold. The transition detector may incorporate any appropriate known circuit, such as the circuits described in U.S. Pat. Nos. 4,319,286—Hanpachern, or 4,314,285—Bonner et al. The transition detector 16, as described in the patents referred to above responds to any drop in the video and audio content of the television signal below a predetermined amplitude to generate an output pulse. Since this circuit is described in circuit detail in the Hanpachern and Bonner et al patents, there is no need to incorporate a circuit diagram herein.

The output pulses from transition detector 16 are applied to a control circuit 18 which may be of the type shown in FIG. 2. Control circuit 18 is unresponsive to the output pulses from detector 16, unless a particular output pulse is followed by a successive output pulse within a predetermined time interval corresponding to the predetermined time interval of the delay imparted to the television signal by delay unit 14.

Accordingly, each time there is a transition in the received television signal, the detector 16 produces an output pulse. The control circuit 18 then waits to determine whether the particular output pulse from detector 16 is followed during the predetermined time interval by one or more additional output pulses from transition detector 16. While the control circuit is waiting, the incoming television signal is being delayed in delay unit 14. At the end of the commercial interval, the television signal from the delay unit 14 is applied to the video tape recorder 12.

If the first pulse applied by transition detector 16 to control circuit 18 is followed by one or more additional pulses during the predetermined time interval, the control circuit 18 introduces an editing signal to the remote pause control of the video type recorder 12, so that the video tape recorder is stopped from the start of the first commercial in the group to the end or the last commercial in the group (regardless of the duration of the individual commercials), and none of the commercials is recorded.

If, on the other hand, the first pulse from detector 16 is not followed by a second pulse during the predetermined time interval, indicating that the fade in the video content of the television signal and the drop in the audio signal were a part of the actual program, and not a commercial break, control circuit 18 does not produce the editing control signal, and the delayed television signal from delay unit 14 is recorded by the video tape recorder.

The output from the control circuit may be used to start up the substitute message tape cassette (FIG. 4) instead of stopping the video tape recorder, so that different recorded information may be inserted into the program, if so desired, in place of the commercials.

Control circuit 18 may be implemented by a variety of circuit configurations. One such circuit configuration is shown, for example, in FIG. 2.

In the circuit of FIG. 2 the detected pulses from the transition detector 16 are applied to the set input of a flip-flop 50, and through an "and" gate 52 to the set input of a flip-flop 54. The Q output of flip flop 50 is connected to an "and" gate 56, as is a clock oscillator 58. The output of "and" gate 56 is applied to the clock input of a counter 60 designated "counter #1", and to the clock input of a counter 62 designated "counter #2". An intermediate output of counter 60 is connected to an "and" gate 64, as is the $\overline{Q}$ output of flip-flop 54. The output of "and" gate 64 is introduced through an "or" gate 66 to the reset input of counter 60, and through an "or" gate to the reset input of flip-flop 50. The Q output of flip-flop 50 is also introduced to "and" gate 52.

The output of counter 60 is applied to the set input of a flip-flop 70, and the output of counter 62 is applied to the reset input of that flip-flop. The output of counter 62 is also applied to "or" gate 66 and to "or" gate 68, as well as to an "or" gate 72. The output of "or" gate 72 is applied to the reset input of counter 62. The transition pulses from detector 12 are also applied to "or" gate 72. The Q output of flip-flop 70 is connected to the remote pause control of video tape recorder 12. Whenever flip-flop 70 is set, the video tape recorder 12 is put in its pause mode and does not record the incoming television signal until the flip-flop 70 is returned to its reset condition.

When the transition detector 12 detects a transition in the video and audio content of the television signal from television receiver 10, it generates a pulse, as explained above. This transition pulse sets the flip-flop 50 which enables "and" gate 56, so that clock pulses from clock oscillator 58 are applied to counter 60, and to counter 62, and both counters begin to count together.

Should a subsequent transition pulse be received from detector 12 during the time interval established by delay unit 14, counter 62 is reset, and begins to recount from the time of occurrence of the second pulse. Likewise, should any additional transition pulses be received during the predetermined time interval, the counter 60 (#2) is reset for each such pulse, but immediately begins to count once more. These transition pulses which occur during the time interval established by delay unit 14 represents the beginning and end of each subsequent commercial in the particular group. The last such pulse to occur enables counter 62 to count to a count corresponding to the predetermined time interval established by the delay unit 14.

Counter 60, on the other hand, proceeds uninterrupted with its count, after the first transition pulse during the predetermined time interval has set the flip-flop 50. Accordingly, the counter 60 proceeds to a count representing a time corresponding exactly to the predetermined time interval, so that the output of the counter 60 at that particular count occurs at the precise moment that the first commercial arrives at the output of the delay unit 14, and at that precise moment, flip-flop 70 is set, setting the video tape recorder 12 to its pause mode.

On the other hand, the last transition pulse to occur during the predetermined time interval, representing the end of the last commercial arrives at the output of counter 62 at the end of the commercial, and resets flip-flop 70 at that time so that the video tape recorder can continue to record.

The second transition pulse received during the predetermined time interval also sets the flip-flop 54 which, in turn, disables "and" gate 64. If no second pulse is received during the predetermined interval in a time exceeding the length of an individual commercial, counter 60, when it reaches its predetermined intermediate count resets flip-flop 50 and counter 60, so that the system is restored to its initial condition, and the television signal being delayed by the delay unit 14 is recorded when it reaches the video tape recorder 12. This is desired, because a single transition pulse, which is not followed by subsequent transition pulses during the predetermined interval represents merely an interruption in the program itself, and not a commercial message. This latter circuit assures that the system will not respond to spurious transitions in the program itself, which would otherwise cause the program to be interrupted.

The invention provides, therefore, a system for editing commercials from television broadcasts which are recorded on video tape recorders. As described, the system of the present invention has an advantage in that it does not respond to fades within the program content itself, but responds only to fades which indicate the beginning and end of a commercial break. As also described, the system of the invention is capable of responding to a series of commercials regardless of their individual durations so as to delete the entire commercial sequence. The video tape recorder is controlled precisely at the transitions in the television signal at the beginning and end of each commercial break so there is no inadvertent loss in program content of the television signal being recorded.

When the system is not in the delay mode, another function of this system is to be able to record simultaneously from two different television channels at the same time, while viewing a third channel. This is achieved by providing an additional tuner in the unit and by using the delay tape to record a separate channel from the channel being recorded on the original tape. A further function of this system, when not in the delay mode, is to be able to copy pre-recorded information tape-to-tape.

Figure 5:
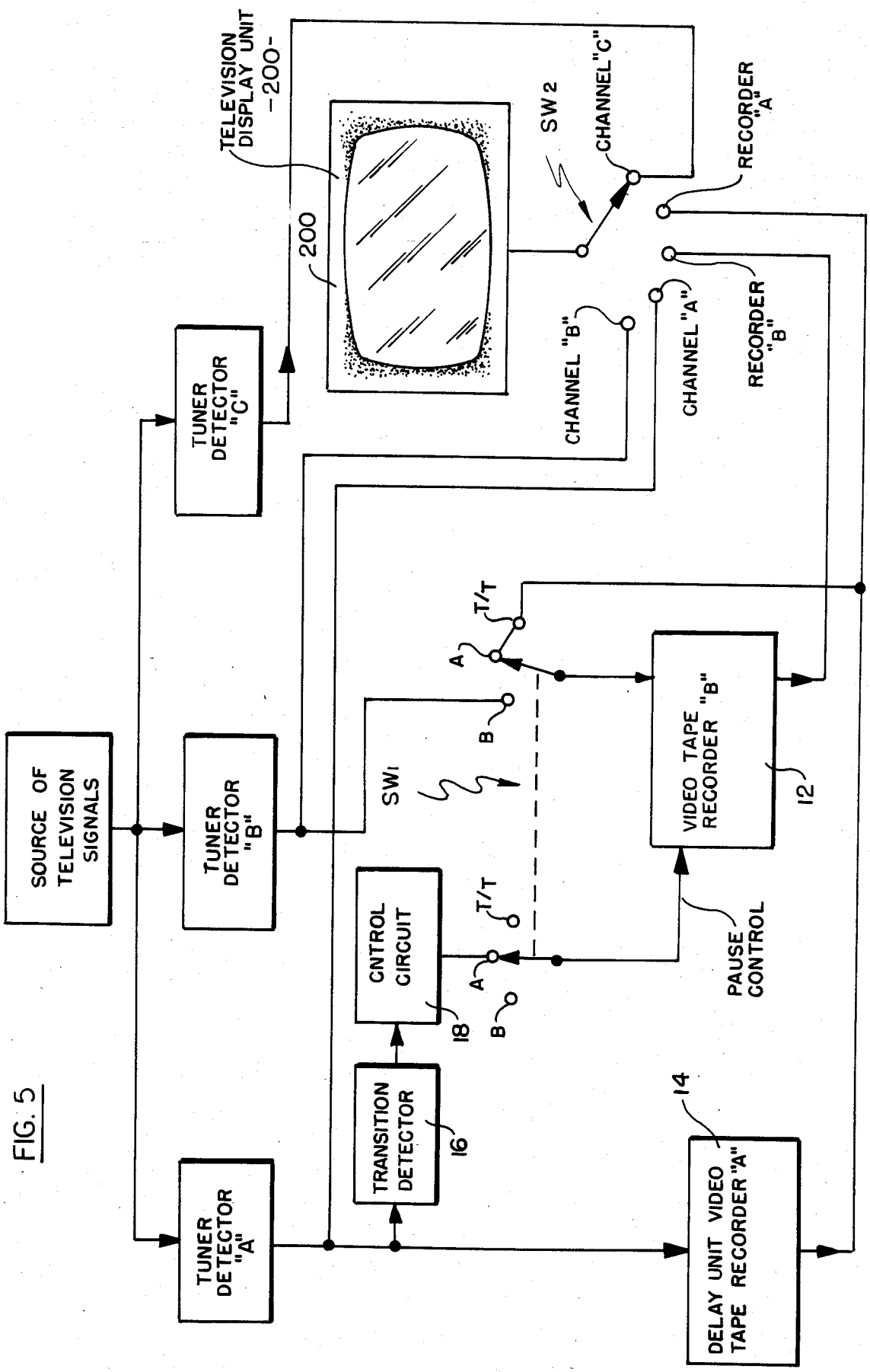
FIG. 5 is a block diagram showing the system of the invention in one of its embodiments, and capable of being switched to various modes of operation.

A block diagram of the multi-function system is shown in FIG. 5. The system of FIG. 5 includes three tuner detectors designated "A", "B" and "C" which are all connected to an appropriate source of television signals, such as a typical cable. The tuner detector "A" is connected to the delay unit 14 described above which is designated delay video recorder A. In the manner described, the delay video tape recorder delays television signals received from tuner detector A.

Tuner detector A is also connected to transition detector 16 which, in turn, is connected through control circuit 18 to stationary contact A of a first section of a switch SW1. The movable contact of the first section of switch SW1 is connected to the pause control of the video tape recorder 12 described above, and designated video tape recorder "B" in FIG. 5.

The delay video tape recorder "A" is connected to a pair of stationary contacts designated A and T/T of a second section of switch SW1, the movable contact of which is connected to the video tape recorder "B".

Tuner detector B is connected to contact B of the second section of switch SW1. Tuner detectors "A" and "B" are also respectively connected to two contacts of a switch SW2, the respective contacts being designated channel "A" and channel "B". The movable contact of switch SW2 is connected to a television display unit 200. Tuner detector C is connected to a fixed contact designated channel "C" of switch SW2. The video tape recorders "A" and "B" are connected to respective fixed contacts of switch SW2 designated recorder "A" and recorder "B".

When the system of FIG. 5 is to be placed in the mode described above in which television programs are recorded on video tape recorder "B" without commercials, switch SW1 is placed in the "A" position, as shown, and tuner detector A is tuned to the channel to be recorded. The incoming television signals are then introduced to the video tape recorder B through contact A of the right-hand section of SW1, from the delay video tape recorder "A". The editing output of control circuit 18 is applied to the pause control of the video tape recorder "B". Accordingly, the video tape recorder records television programs without commercials in the manner described above.

At the same time, switch SW2 may be switched to channel "C", so that a different channel derived from tuner detector "C" may be viewed on the television display unit 200. Alternately, the switch SW2 may be set to view television programs from tuner detector A or tuner detector B, merely by setting the switch SW2. As a further choice, the television display unit may view programs previously recorded on either tape recorder A or tape recorder B by setting the switch SW2 to recorder "A" or recorder "B".

Switch SW1 may be set to the B position, so that programs from tuner detector B may be directly recorded on the video tape recorder "B" without any commercial editing control.

As a third alternative, switch SW1 may be set to the T/T position, and a tape bearing a previously recorded program may be inserted into the delay unit 14, and the program from that tape may be recorded on a second tape in the video tape recorder "B". At the same time, the program on the tape in the video tape recorder "A" may be viewed on the television display unit 200, merely by setting the switch SW2 to the recorder "A" position.

It will be appreciated while particular embodiments of the invention have been shown and described, modifications may be made. It is intended in the claims to cover all modifications which come within the true spirit and scope of the invention.

I claim:

1. A system for deleting the commercial messages of a television signal when the television signal is recorded by a video tape recorder, said system including: a source of television signals; a tuner detector circuit connected to said source for producing video signals representative of selected television programs; a video tape recorder; a delay means connected to said tuner detector circuit and to said video tape recorder for applying video signals from said tuner detector circuit to said video tape recorder after a predetermined time delay has been imparted to the video signals, said predetermined time delay exceeding the total time duration of a group of successive commercials in the received television signals; a transition detector circuit connected to said tuner detector circuit for generating an output pulse indicative of each time a transition occurs in the video signals from said tuner detector circuit; and a control circuit connected to said transition detector circuit and to said video tape recorder and responsive to said output pulse from said transition detector circuit only when said output pulse is followed by one or more output pulses during a predetermined time interval for producing an editing control signal for the tape recorder, said control circuit responding to a sequence of successive pulses generated by said detector within said predetermined time interval to produce said editing control signal for the video tape recorder, said control circuit responding to said pulses occurring during said predetermined time interval to cause said video tape recorder to be activated at precisely the start of the first commercial message occurring during said predetermined time interval and to be reactivated precisely at the end of the successive commercial messages occurring during said predetermined time interval, and said control circuit including a first counter activated by a first pulse from said transition detector, and a second counter activated by said first pulse but reset by each succeeding pulse from said detector circuit generated during said predetermined time interval following said first pulse, said first pulse counter establishing the start of said editing control signal should it reach a count corresponding to said predetermined time delay, and said second counter establishing the end of said editing control signal should it reach a count corresponding to said predetermined time delay.

2. The system defined in claim 1, in which said predetermined time interval corresponds to the time delay imparted to the video signals by said delay means.

3. The system defined in claim 1, and which includes circuit means connected to said first counter for resetting the first counter and said control circuit when said first counter reaches a predetermined count and no successive pulses from the transition detector circuit has occurred.

4. The system defined in claim 1, in which said delay means comprises a further video tape recorder including means for recording incoming video information on a video tape inserted into said further video tape recorder.

5. The system defined in claim 4, and which includes circuit means enabling video information recorded on the video tape inserted into said further video tape recorder to be recorded on said first-named video tape recorder.

6. The system defined in claim 4, and which includes a second tuner detector circuit connected to said source of television signals, and circuit means enabling video signals from said second tuner detector circuit to be recorded on said first-named video tape recorder.

7. The system defined in claim 4, and which includes a television display unit, and switching circuitry connected to said tuner detector circuit and to said first-named video tape recorder, and to said further video tape recorder to enable video information therefrom to be selectively displayed on said display unit.

8. The system defined in claim 6, and which includes a television display unit, and switching circuitry connected to said first-named tuner detector circuit and to said second tuner detector circuit and to said first-named video tape recorder, and to said further video tape recorder to enable video information therefrom to be selectively displayed on said display unit.

9. The system defined in claim 8, and which includes a third detector circuit, and in which said switching circuitry is also connected to said third detector circuit to enable video information therefrom to be selectively displayed on said display unit.

* * * * *